United States Patent [19]

Csuri et al.

[11] Patent Number: 4,795,119
[45] Date of Patent: Jan. 3, 1989

[54] MOUNTING BRACKET

[75] Inventors: John O. Csuri, Middletown; Bernard A. DeSiena, Parlin, both of N.J.; Chris G. Johnson, New York, N.Y.; David L. Kisenwether, Belford, N.J.

[73] Assignees: American Telephone and Telegraph Company, New York, N.Y.; AT&T Information Systems Inc., Morristown, N.J.

[21] Appl. No.: 907,522

[22] Filed: Sep. 15, 1986

[51] Int. Cl.$^4$ ............................................. A47H 1/16
[52] U.S. Cl. .............................. 248/222.2; 248/311.2; 248/302; 211/88
[58] Field of Search .................. 248/222.2, 222.3, 302, 248/175, 223.4, 231.8, 309.1, 310, 311.2, 312.1, 316.7, 316.8, 340, 221.3, 153; 211/88, 89, 106

[56] References Cited

U.S. PATENT DOCUMENTS

| | | | |
|---|---|---|---|
| 1,231,849 | 7/1917 | Clinton | 248/153 X |
| 1,365,689 | 1/1921 | Haywood | 248/302 |
| 1,378,902 | 5/1921 | Roehl | 248/302 |
| 1,776,354 | 9/1930 | Edmands | 248/175 X |
| 2,179,844 | 11/1939 | Erlanger | 248/312.1 |
| 2,263,956 | 11/1941 | Russell | 248/311.2 |
| 2,456,535 | 12/1948 | Rundell | 248/302 |
| 2,460,906 | 2/1949 | Schmiedeberg | 248/311 |
| 2,461,374 | 2/1949 | Custer | 248/175 X |
| 2,603,438 | 7/1952 | Adams | 248/302 |
| 2,678,184 | 5/1954 | Erdody | 248/311 |
| 2,864,575 | 12/1958 | Stewart | 248/302 |
| 2,924,671 | 2/1960 | Barry | 248/302 |
| 3,313,504 | 4/1967 | Stoltze | 248/302 |
| 3,391,891 | 7/1968 | Garden | 248/311 |
| 3,614,982 | 10/1971 | Krizman | 248/311.2 X |
| 3,870,154 | 3/1975 | Monet | 248/311.2 |
| 4,009,810 | 3/1977 | Shook | 248/311.2 |
| 4,143,845 | 3/1979 | Harris | 248/221.2 |
| 4,248,352 | 2/1981 | White | 211/88 |
| 4,269,381 | 5/1981 | Harms | 248/222.2 |
| 4,343,405 | 8/1982 | Virte et al. | 211/88 |
| 4,646,921 | 3/1987 | Canter | 211/126 |

Primary Examiner—Alvin C. Chin-Shue
Attorney, Agent, or Firm—Frederick B. Luludis

[57] ABSTRACT

A mounting bracket formed from a length of wire in a double-L configuration includes retaining clips which engage corresponding grooves formed in a modular cross-connect unit. The flexibility of the bracket's L-shape itself provides a spring function that holds the unit in the bracket when the grooves in the unit engage the retaining clips.

9 Claims, 3 Drawing Sheets

MOUNTING BRACKET

FIELD OF THE INVENTION

The invention relates to a mounting bracket for use in telecommunication arrangements and, in particular, a mounting bracket to hold a modular cross-connect unit.

BACKGROUND OF THE INVENTION

In telecommunications, a telephone station set or a computer terminal may be connected to illustratively a key telephone system or a local area network, respectively, via a so-called cross-connect arrangement. Such cross-connect arrangements are usually located in a wiring closet where they are fastened to a wall. In recent times, such arrangements have been modularized and employ the so-called universal telephone jack and plug to allow users to make their own connections without using skilled personnel. Moreover, electronic circuitry has been added to cross-connect arrangements for local area networks to allow the user to either expand the network or change its configuration. However, because such prior cross-connect arrangements are fastened directly to a wall it is very difficult and burdensome to replace a malfunctioning universal telephone jack. Indeed, it may not be the type of task that the average user can perform and an attempt by an unskilled user to replace, for example, a universal telephone jack, would be difficult and would be futile if the cross-connect unit happens to be bolted to a wall.

SUMMARY OF THE INVENTION

We have realized that a more desirable approach to mounting a cross-connect unit is one that does not fasten the unit directly to a wall. Specifically, in our arrangement, the cross-connect unit is mounted in a bracket which allows the unit to be easily removed therefrom. The bracket, in accordance with the invention, is formed from a length of wire in a double-L configuration such the vertical legs of the bracket are spatially separated by a U-shaped section that is offset toward the horizontal legs. Another length of wire bridges and attaches to the horizontal legs. Grooves formed in the cross-connect unit engage the U-shaped section and bridging wire, respectively, which firmly press against the unit as a result of the flexibility of the bracket's L shape. The bracket, rather than the cross-connect unit itself, is fastened to a wall by passing fastening devices through holes formed in the vertical legs and into the wall of the wiring closet.

In accordance with one aspect of the invention, the ends of the horizontal legs are bent such that they slant downward so that the crossconnect unit can be easily inserted in the bracket. In accordance with another aspect of the invention, the end of one of the horizontal legs is bent a second time to form a U-shaped section for holding illustratively a label holder bearing a label identifying the unit mounted in the bracket.

BRIEF DESCRIPTION OF THE DRAWINGS

These and other objects and features, together with the operation and utilization of the present invention, will be more apparent from the illustrative embodiment shown in conjunction with the drawings in which.

DETAILED DESCRIPTION

Figure 1:
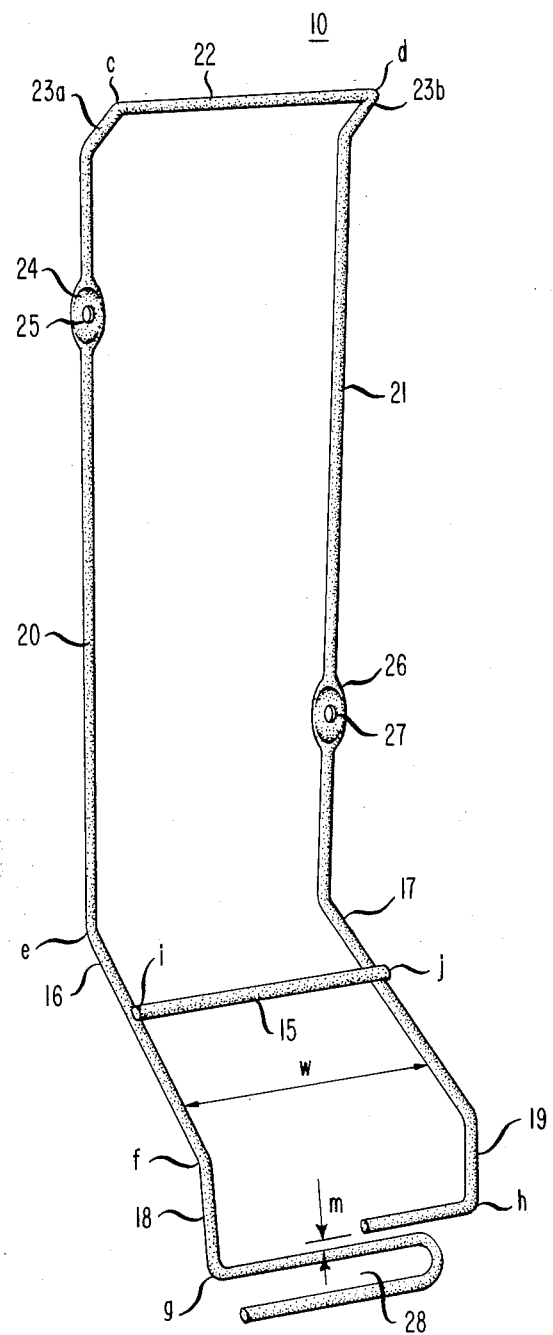
FIG. 1 depicts a mounting bracket formed in accordance with the invention.

As shown in FIG. 1, mounting bracket 10 is formed, in accordance with the invention, from a length of wire into a double-L configuration. Another length of wire 15 bridges the horizontal legs 16 and 17 at substantially the midpoint thereof. The wire that is used to form the double-L portion of bracket 10 is illustratively 0.1560 inch nickel plated steel wire and wire 15 is illustratively 0.120 inch nickel plated steel wire.

Specifically, the length of wire 15 as measured from point i to point j is illustratively 2.4 inches, which is slightly longer than the width w of the spatial separation between horizontal legs 2 or members, 16 and 17. Wire 15 is attached to legs 16 and 17 using, for example, the well-known resistance welding technique. As will be discussed below, wire 15 serves as a retaining clip, which engages a corresponding groove formed in a housing for a modular cross-connect unit. It also serves to maintan the spatial separation between legs 16 and 17. The length of horizontal legs 16 and 17 as measured from point e to point f is illustratively 5.8 inches. (Hereinafter wire 15 will be referred to as retaining clip 15).

As shown, the end portions 18 and 19 of horizontal legs 16 and 17, respectively, are offset, or slanted, in the downward direction, illustratively 45 degrees, from the plane defined by legs 16 and 17. The space M between the overlapped sections is used to pass the cables through, thereby providing a means to neatly route a large number of cables (shown in FIG. 2). End portions 18 and 19 are bent inward at point g and h, respectively, and overlap each other, as shown. End portion 18, being longer than end portion 19, is further bent to form a U-shaped section indicated at 28. As will be shown below, a label holder bearing a label may be clipped onto U-shaped section 28 to identify the cross-connect unit that is mounted in bracket 10. Ends 18 and 19 could, alternatively, be tack-welded together.

The spatial separation between vertical legs 2 or members, 20 and 21 of bracket 10 is maintained by the width of section 22, which bridges legs 20 and 21. The width of member 22 is illustratively 2.2 inches as measured between points c and d. Section 22 and respective portions 23a and 23b of veritical legs 20 and 21 form a U-shaped section which slants forward, illustratively 45 degrees, from the plane defined by vertical legs 20 and 21. This U-shaped section serves as a retaining clip and slips into a corresponding groove that is formed in the cross-connect unit, as will be shown below. The height of bracket 10 as measured vertically between points c and e is illustratively 10.4 inches. (The U-shaped section formed by section 22 and portions 23a and 25b will hereinafter be referred to as retaining clip 22).

Bracket 10 may be fastened to illustratively a wall by pasing an appropriate fastening device through holes 25 and 27, respectively, and into the wall. Holes 25 and 27 are formed in vertical legs 20 and 21, respectively, using, for example, the well-known swaging and piercing process. Swaging reduces the thickness of the steel wire at the point where the holes is to be formed such that the steel wire spreads out, as depicted at 24 and 26. The center of the swaged material is then pierced to form a hole, such as holes 25 and 27.

Figure 2:
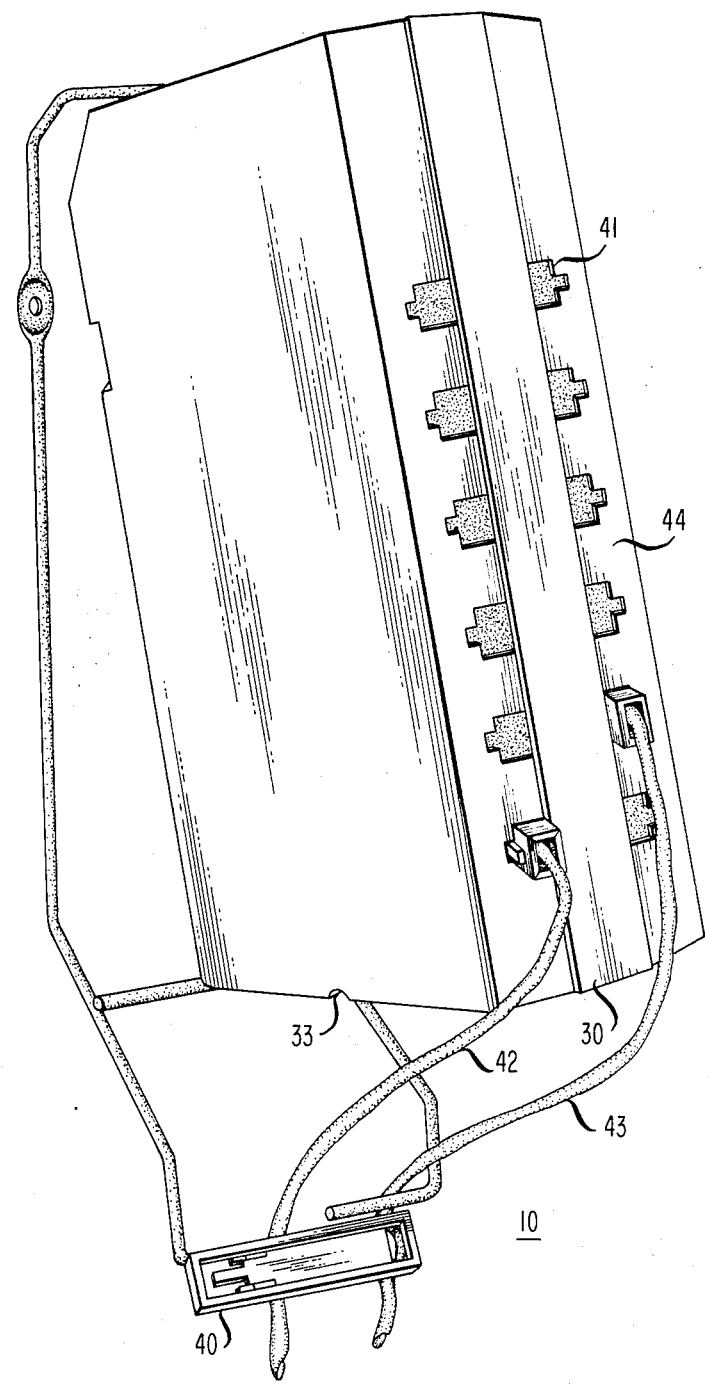
FIG. 2 depicts a front perspective view of a modular crossconnect unit adapted to be mounted in the bracket of FIG. 1.

Referring now to FIG. 2, there is shown a front perspective view of the housing that is about to be inserted into bracket 10.

As shown in FIG. 2, housing 30 may be used, for example, to house a modular cross-connect unit. Thus, hereinafter housing 30 will be referred to as unit 30. In particular, unit 30 includes two columns of universal telephone jacks, such as jack 41, which are mounted and accessed at the front 44 of unit 30. A user may establish a connection between, for example, a computer terminal and a local area network, using a patching cable, such as one of cables 42 or 43, that is terminated at both ends with a universal telephone plug. The user establishes such a connection by merely plugging one end of the cable into one jack on unit 30 to establish a connection to the network and plugging the other end of the cable into another jack that may be mounted on a computer terminal or on another unit 30 to extend the connection of the local area network.

The procedure of inserting unit 30 into bracket 10 commences with engaging groove 31 with retaining clip 22. Unit 30 is then rotated downward and into bracket 10. Since the height of unit 30 is illustratively larger than the height of bracket 10, i.e., the latter being measured from the retaining clip 22 to the top of clip 15, unit 30 will cause the clip 22 to flex upward and cantilevered horizontal legs 16 and 17 of bracket 10 to flex downward to allow groove 33 to be positioned over clip 15. When groove 33 is so positioned, the spring function of the double-L configuration allows clip 22 and legs 16 and 17 to relax, thereby allowing clip 15 to slip into groove 33. Insertion is facilitated by the fact that end portions 18 and 19 of horizontal legs 16 and 17 are slanted downward, as mentioned above.

FIG. 2 also shows label holder 40 clipped onto the aforementioned U-shaped section 28 of horizontal leg 16.

Figure 3:
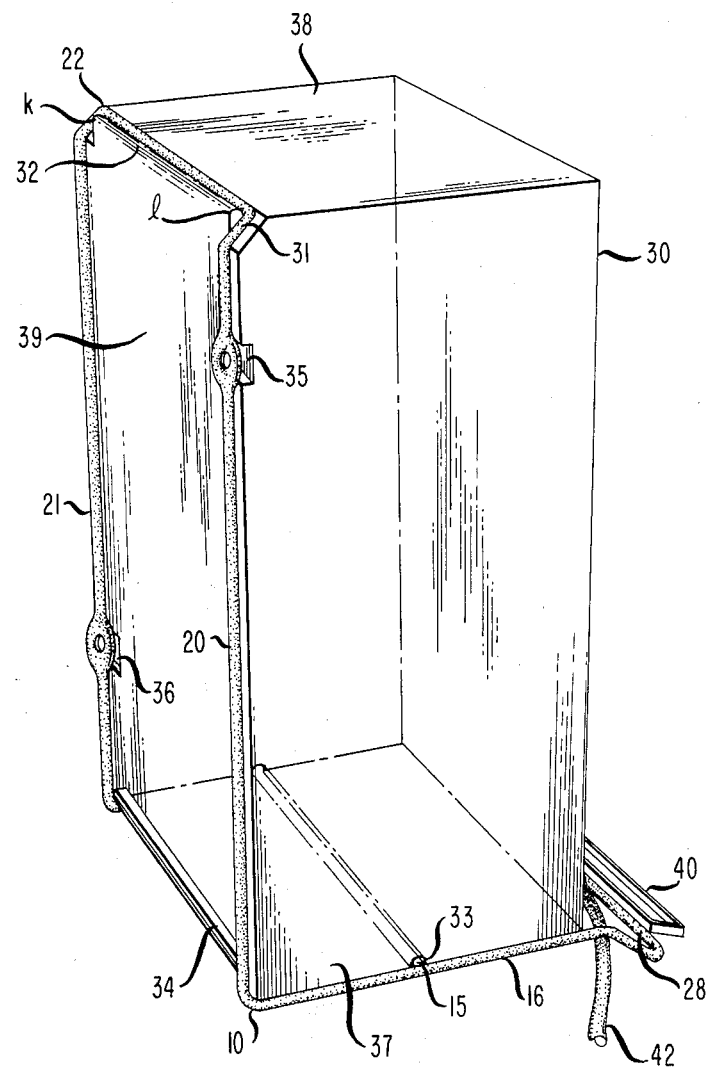
FIG. 3 depicts a rear perspective view of the unit of FIG. 2 mounted in the bracket of FIG. 1.

Referring now to FIG. 3, there is shown a rear perspective view of unit 30 inserted in bracket 10. Specifically, the shape and contour of groove 31 formed between the top 38 and rear 39 surfaces of unit 30 matches the shape and contour of retaining clip 22 of bracket 10, such tht clip 22 slips into groove 31 as unit 30 is being inserted into bracket 10. Retaining clip 22 is held in groove 31 by the wall 32 of groove 31. The width of wall 32, i.e., the distance between the end points k and l thereof, is illustratively 2.09 inches.

As shown in FIG. 3, the shape of groove 33 formed in the bottom surface 37 of unit 30 is adapted to engage retaining clip 15 of bracket 10 when unit 30 is fully inserted into bracket 10. Moreover, unit 30 includes an alignment bar, or key, 34 that is illustratively molded into the rear 39 of unit 30 near its bottom to align unit 30 with bracket 10. Alignment bar 34 is disposed between vertical legs 20 and 21 when unit 30 is in alignment with bracket 10, thereby allowing groove 33 to engage retaining clip 15. If unit 30 is not in alignment with bracket 10, then bar 34 makes contact with either leg 20 or leg 21 and prevents retaining clip 15 from slipping into groove 33.

Unit 30 also includes slots 35 and 36. Slots 35 and 36 are adapted to cover the heads of fastening devices that may be inserted into holes 25 and 27, respectively, so that the heads do not interfere with the insertion of unit 30 into bracket 10.

The above-described insertion procedure is reversed to remove unit 30 from bracket 10, i.e., clip 15 and groove 33 are disengaged by pressing down on legs 16 and 17 and unit 30 is rotated upward and outward to disengage clip 22 and groove 31. Accordingly, in the event that either illustratively a universal telephone jack or expansion circuit mounted in unit 30 malfunctions, then all the user needs to do is (a) remove the patching cables from the unit 30 jacks, (b) remove unit 30 from bracket 10, (c) insert another unit 30 into bracket 10, and (d) repatch the cables. The malfunctioning unit 30 can then be repaired or replaced.

The foregoing is merely illustrative of the principles of our invention. Those skilled in the art will be able to device numerous arrangements which, although not explicitly shown or described herein, embody these principles and are within its spirit and scope.

What is claimed is:

1. A mounting bracket in combination with a housing for a cross-connect unit, comprising first and second L-shaped sections disposed in spaced-apart parallel relationship including a first retaining clip bridging the free ends at one end of respective vertical members of said first and second sections, a second retaining clip bridging respective horizontal members of said first and second sections, said housing comprising, a first groove formed between a rear and a top surface of said housing engaging said first retaining clip, and a second groove formed in a bottom surface of said housing for engaging said second retaining clip when said housing is inserted in said bracket 2. The invention set forth in claim 1 wherein said first and second sections and said first retaining clip are formed from a single length of wire.

3. The invention set forth in claim 1 wherein said first retaining clip slants foward toward said horizontal members.

4. The invention set forth in claim 1 wherein said bracket further includes means for fastening said bracket to a surface.

5. The invention set forth in claim 1 wherein said housing includes a plurality of jacks mounted on a front surface of said unit.

6. The invention set forth in claim 1 wherein said second retaining clip bridges the midpoints of said horizontal members.

7. A mounting bracket in combination with a housing for a cross-connect unit, comprising first and second L-shaped sections disposed in spaced-apart parallel relationship including a first retaining clip bridging the free ends at one end of said first and second sections, a second retaining clip bridging respective horizontal members of said first and second sections, the free ends at the other end of said first and second sections slant downward away from a plane defined by said horizontal members, one of said other free ends being formed into a U-shaped section, said housing comprising, a first groove formed between a rear and top of said housing for engaging said first retaining clip, and a second groove formed in a bottom surface of said housing for engaging said second retaining clip.

8. A mounting bracket in combination with a housing for a cross-connect unit, comprising first and second L-shaped sections disposed in spaced-apart parallel relationship including a first retaining clip briding the free ends at one end of said first and second sections, a second retaining clip bridging repsective horizontal members of said first and second sections, said housing comprising, a first groove formed between a rear and top surface of said housing for engaging said first retaining clip, and a second groove formed in a bottom surface of said housing for engaging said second retaining clip, and a key formed in said rear surface for facilitating aligning said housing with said bracket when said housing is being inserted in said bracket.

9. In combination, a bracket comprising first and second sections, each of said sections having first and second members, said second members being cantilevered from said first members, a first retaining clip bridging said first members, a second retaining clip bridging said second members, and a housing comprising means forming a first groove for engaging said first retaining clip, means forming a second groove for engaging said second retaining clip, and a key formed in a rear surface of housing, said key being disposed on said rear surface in such a way that when said housing is inserted in said bracket said key is positioned between said first members.

* * * * *

UNITED STATES PATENT AND TRADEMARK OFFICE
CERTIFICATE OF CORRECTION

PATENT NO. : 4,795,119

DATED : January 3, 1989

INVENTOR(S) : John O. Csuri, Bernard A. DeSiena, Chris G. Johnson and David L. Kisenwether It is certified that error appears in the above-identified patent and that said Letters Patent is hereby corrected as shown below:

```
Column 1, line 42, after "such" insert --that--.
Column 2, line 19, after "legs" delete "2" and insert a comma.
Column 2, line 44, after "vertical legs" delete "2" and insert a
                   comma.
Column 4, line 12, "device" should read --devise--.
Column 4, line 31, delete "for".
Column 5, line  1, "briding" should read --bridging--.
```

Signed and Sealed this

Twenty-fifth Day of July, 1989

Attest:

DONALD J. QUIGG

Attesting Officer

Commissioner of Patents and Trademarks